Sept. 27, 1960   H. S. HEMSTREET   2,954,514
SERVOMECHANISM
Filed Nov. 29, 1956                              3 Sheets-Sheet 1

HAROLD S. HEMSTREET
INVENTOR

BY Darby & Darby
ATTORNEYS

Sept. 27, 1960 H. S. HEMSTREET 2,954,514
SERVOMECHANISM
Filed Nov. 29, 1956 3 Sheets-Sheet 2

HAROLD S. HEMSTREET
INVENTOR

BY *Darby & Darby*

ATTORNEYS

Sept. 27, 1960     H. S. HEMSTREET     2,954,514

SERVOMECHANISM

Filed Nov. 29, 1956     3 Sheets-Sheet 3

HAROLD S. HEMSTREET
INVENTOR

BY *Darby & Darby*

ATTORNEYS

United States Patent Office 2,954,514
Patented Sept. 27, 1960

2,954,514

SERVOMECHANISM

Harold S. Hemstreet, Binghamton, N.Y., assignor to General Precision, Inc., a corporation of Delaware Filed Nov. 29, 1956, Ser. No. 625,046

7 Claims. (Cl. 318—28)

This invention relates to servomechanisms and more particularly to methods and means for reducing the velocity lag and otherwise improving the dynamic response of servomechanisms. In the electric arts generally, and particularly in the analogue computer, automatic control, and instrumentation arts, a wide variety of actual and physical phenomena are controlled or simulated by means of computing apparatus which utilizes one or more servomechanisms.

The servomechanisms often are required to provide mechanical shaft positions commensurate with the value of computing quantities which have been derived by integrating previously derived computer quantities. For example, much apparatus of the above described type utilizes electromechanical or electronic integrators to integrate computer acceleration quantities with respect to time, to provide computer velocity quantities. The velocity quantities then may be integrated with respect to time to provide position quantities. Such successive integrations are widely performed, both upon angular and translatory acceleration and velocity computer quantities.

In order to provide accurate operation of such apparatus, it is usually necessary that the position of servomechanisms responsive to the position computer quantity be capable of providing the correct shaft position as instantaneously as is possible, and that the position servo output position not depart appreciably from the computed position at any time.

It is well known in the computer and servomechanism arts that one may improve servomechanism operation from one respect by applying a rate signal to the servo input circuit. A simple position servo utilizing only position feedback is unstable unless operated at a small value of loop gain, which requirement inherently provides undesirably large velocity lags. The use of tachometer generators and other rate-taking devices driven by the position servo to provide a first derivative feedback signal has become usual, since the provision of such a damping signal for addition to the input signal and position feedback signal allows servo loop gain to be considerably increased without causing instability. In effect, tachometer feedback is similar to additional viscous friction.

Rate feedback has proven to be very useful in generally improving servo operation, as may be assumed from its very widespread usage, but the invention provides certain advantages over typical rate feedback such as has heretofore been used to allow increased servo loop gain. The invention discloses means which provide markedly better servo frequency response in a simple and economical manner. Simple tachometer generator derived rate feedback is inherently dependent upon the characteristics of the tachometer generator or other rate feedback means utilized, so that hysteresis, back-lash, non-linearities, and other limitations of contemporary tachometer generators adversely affect the overall servo response.

I have discovered that the frequency response of position servos intended to provide a mechanical output quantity commensurate with an applied input quantity may be considerably improved by making certain modifications to the input quantity. Specifically, the input quantity may be modified in accordance with a transfer function which is the inverse of the servo overall transfer function. As will be shown below, the input quantity may be modified in the required manner by adding to it further input quantities which are time derivatives of the original input quantity. Also, I have discovered that position servos utilized to provide shaft positions commensurate with the output of integrating devices may be connected so as to achieve markedly better frequency response by the use of previously computed time derivative signals in place of or in addition to the "feed-back" time derivative signals heretofore utilized for other purposes.

While the present invention has particular significance in providing improved results relative to position servo systems, it is not limited thereto. It may also be applied to integrating velocity servo systems, sometimes known as type 1 servo systems, which are used where a linear relationship is desired between an input signal and the rate at which the servo output shaft rotates. Specifically, I have discovered that the input quantity of an integrating velocity servo may be modified in accordance with a transfer function which will modify the overall transfer function such that it appears as one over the Heaviside differential operator $p$.

It is therefore a primary object of the present invention to provide an improved position servo having better frequency response.

It is another object of the invention to provide means for improving in an economical manner the frequency response of a position servo which is responsive to the output quantity of a single or a successive pair of integrating devices.

It is a further object of the present invention to provide an improved integrating velocity servo system.

It is still another object of the present invention to provide a means of improving transient response of an integrating velocity servo system.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
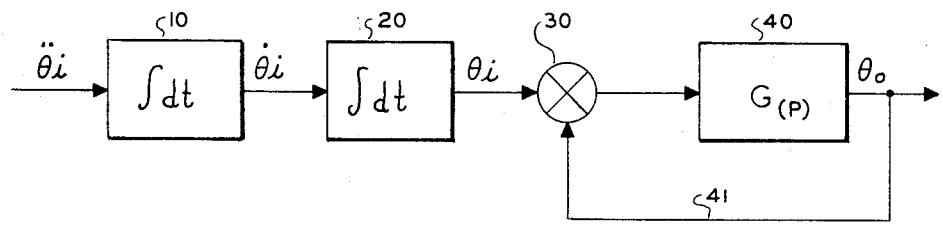
Fig. 1 is a block diagram illustrating a conventional prior art position servo.

Shown in Fig. 1 is a block diagram illustrating the flow of computed data in a conventional prior art servo system. An input quantity $\ddot{\theta}_1$ is applied to an integrating means 10 to be integrated with respect to time to provide a $\dot{\theta}_1$ quantity which is further integrated with respect to time to provide a $\theta_1$ quantity. In a typical application, $\ddot{\theta}_i$ might represent an acceleration, actual or simulated, in which case $\dot{\theta}_i$ would represent a velocity and $\theta_i$ would represent a position. Obviously, the acceleration, velocity and position might be either angular or translatory. A servomechanism comprising comparing means 30, amplification and motive means 40 and feedback connection 41 is provided to convert the $\theta_i$ input quantity to a mechanical position commensurate with the $\theta_i$ quantity. In typical applications the $\ddot{\theta}_i$ quantity might be derived from an accelerometer or from some means for producing a quantity commensurate with a simulated acceleration, and the $\ddot{\theta}_i$ quantity might exist either as a mechanical position, an electrical potential, or other physical magnitude. Integrators 10 and 20 might comprise ball-disc integrators or other common mechanical integrators if mechanical inputs are applied to them. If $\ddot{\theta}_i$ and/or $\dot{\theta}_i$ exist as electrical voltages, integrators 10 and 20 might comprise conventional velocity servos. If the two quantities existed as direct electrical voltages, Miller integrators would likely be used.

The $\theta_i$ input quantity is applied to a comparer means 30 to be compared with a quantity applied to the comparer by feedback connections 41, and the difference $\epsilon$ between the input quantity and the feedback quantity, which difference is commonly termed the "error" quantity, is supplied to amplifying and motive means 40, which serves to provide an output quantity $\theta_o$, usually in the form of a mechanical shaft output position. Typical servomechanisms using mechanical input quantities might be provided with a mechanical differential as a comparer means. Typical electrical servos utilize series or parallel summing of voltages or currents to compare input quantities with feedback quantities. The characteristics of servomechanisms are commonly specified by the servo "transfer function." Assuming a simple electrical servo comprising an electrical amplifier, a motor driven by the amplifier, a "follow-up" or feedback potentiometer and a load, the servo transfer function would express the servo dynamic and static characteristics and take into account the amplifier gain and frequency response, the torque characteristics of the motor, and the inertia, friction and other mechanical characteristics of the motor and load. The transfer function expresses the relationship between servo error quantity and servo output quantity, and in the case of an ideal position servo it is merely a constant. If any dynamic lags or other limitations characterize servo operation, the servo transfer function will be a complex quantity. In Fig. 1, the transfer function of the prior art servo therein is indicated by the symbol $G(p)$.

The following relationships should be apparent from the preceding discussion:

$$\frac{\theta_o}{\epsilon} = G(p) \qquad (1)$$

$$\epsilon = \theta_i - \theta_o \qquad (2)$$

Substituting Expression 2 into Expression 1:

$$\frac{\theta_o}{\theta_i} = \frac{G(p)}{1 + G(p)} \qquad (3)$$

In the case of relatively simple servos, the ordinary servo transfer function may be written as follows:

$$G(p) = \frac{A}{p(1+Tp)} \qquad (4)$$

wherein A is the amplification or gain provided within the servo loop, T is the combined time constant of the servo motor and servo amplifier, and $p$ denotes the Heaviside differential operator.

Expression 4 may be more clearly understood from the following brief derivation. If error quantity $\epsilon$ is multiplied by a factor of A, the gain of the amplifier, and applied to accelerate the servo, by balance of forces it will be seen that:

$$\epsilon A - F\theta_o p - J\theta_o p^2 = 0 \qquad (4a)$$

where

F represents the friction of the servo system,
J represents the moment of inertia of the servo system.

The quantity $F\theta_o p$ will represent all opposing forces commensurate with servo output velocity, $\dot{\theta}$, such as viscous friction, for example, and drag cup force, if such a device is used. The quantity $J\theta_o p^2$ may represent all opposing forces commensurate with servo acceleration, $\ddot{\theta}$, such as inertia, for example. Since $G(p)$ is defined as the ratio between servo error quantity and servo output, or the ratio $\theta_o/\epsilon$, Expression 4a may be seen to agree with Expression 4.

By substituting Equation 4 into Equation 3, one may obtain the following expression:

$$\frac{\theta_o}{\theta_i} = \frac{1}{1 + \frac{1}{A}p + \frac{T}{A}p^2} \qquad (5)$$

Where T, the combined time constant of the system, is commensurate with $J/F$.

This expression describes the behavior of the servo from input to output, and hence the ratio $\theta_o/\theta_i$ may be termed the "overall transfer function" of the servo. It is important to distinguish between such "overall" transfer function and the ratio $\theta_o/\epsilon$, which is ordinarily designated as the servo transfer function. In an instantaneous and perfectly accurate or ideal servo, the ordinary servo transfer function would be infinite, since servo error signal would always be zero. In an instantaneous and perfectly accurate or ideal servo, the ordinary servo transfer function would be infinite, since servo error signal would always be zero. In the instantaneous and perfectly accurate or ideal servo, the servo overall transfer function would be a constant (i.e. unity).

As mentioned above, it is well known in the art that the use of first derivative feedback signals allows the use of increased servo loop gain without instability. By considering feedback connection 41 in Fig. 1 to apply a $\dot{\theta}_o$, or first derivative quantity, as well as the $\theta_o$ or position feedback quantity to comparer means 30, or, in effect, rewriting Equation 2 as follows:

$$\epsilon = \theta_i - \theta_o - \dot{\theta}_o$$

the following transfer function may be obtained:

$$\frac{\theta_o}{\theta_i} = \frac{1}{1 + \frac{1}{A}p + p + \frac{T}{A}p^2}$$

It will be noted that an additional $p$ term (damping term) appears in the denominator of the overall transfer function; thereby making servo output more dependent on frequency; i.e., lessening the servo frequency response, but allowing the servo to stabilize more easily. Similarly, application of second derivative feedback, also known to the prior art, merely changes the value of the $p^2$ term of the servo overall transfer function, detracting from rather than improving frequency response. Since servo stability is inversely related to servo loop gain and servo time constant, servo loop gain may be increased somewhat when rate feedback quantities are used without causing more instability than was originally present, and as shown by the modified overall transfer function, an increase in servo loop gain A somewhat offsets the decrease in frequency response caused by derivative feedback. However, only a limited amount of additional gain may be provided without sacrifice of stability, and unless servo loop gain is made to change with frequency in a precise manner, servo frequency response will not be uniform or "flat."

A further known technique for improving servo operation is the use of a "lead" network to modify the servo error quantity. Such a device provides a $(\epsilon + \dot{\epsilon})$ quantity to the servo amplifier by operating on the servo error quantity. By substituting $(\epsilon + \dot{\epsilon})$ for $\epsilon$ in Equation 1, one may derive the following overall transfer function for a servo utilizing a conventional lead network:

$$\frac{\theta_o}{\theta_i} = \frac{1+p}{1+\frac{p}{A}+p+\frac{T}{A}p^2} \quad (6)$$

It will be seen from a plot of the above expression for various values of frequency that the decrease in servo frequency response from the $p$ term in the denominator is more than offset by the inclusion of the $p$ term in the numerator thereby improving servo frequency response. As will be apparent as the description proceeds, the invention provides means whereby servo frequency response may be made much "flatter" than by use of the above-described prior art techniques. By substituting various values of $j_w$ and $(j_w)^2$ for $p$ and $p^2$ in Expression 6, a plot may be made in conventional manner to show servo frequency response.

Figure 2:
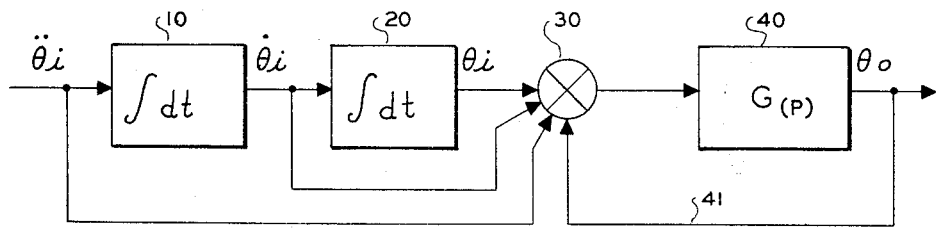
Fig. 2 is a block diagram illustrating one arrangement of the present invention, as it may be applied, for example, to a servo which is responsive to the output from a pair of successive integrating devices.

Shown in block form in Fig. 2 is a diagram illustrating the flow of data in a typical improved servo operated in accordance with the invention. It will be seen that while the internal servo connections between the comparer means, the amplifying and motive means and the feedback connection remain the same in Fig. 2, that two additional input quantities are applied to comparer means 30. One of these quantities comprises a signal commensurate with the first time derivative of the $\theta_i$ input quantity, and, as shown in Fig. 2, it may be applied from the output circuit of integrator 10. The second of the addiitonal quantities, which may be optional in some cases, comprises a second time derivative of the $\theta_i$ input quantity, and as shown in Fig. 2, it may comprise a portion of the acceleration quantity applied as an input quantity to integrator 10. Thus the composite input quantity $\theta_i'$ applied to comparer 30 in Fig. 2 may be seen to be equal to $$(k_{11}\theta_i + k_{12}\dot{\theta}_i + k_{13}\ddot{\theta}_i)$$

wherein $k_{11}$, $k_{12}$ and $k_{13}$ are proportionality constants. Otherwise written, $$\theta'_i = k_{11}\theta_i + k_{12}p\theta_i + k_{13}p^2\theta_i$$

If $\theta_i'$ is substituted for $\theta_i$ in expressions 2, 3 and 5, the following expression may be obtained for the overall transfer function of the improved servo:

$$\frac{\theta_o}{\theta_i} = \frac{k_{11}+k_{12}p+k_{13}p^2}{1+\frac{1}{A}p+\frac{Tp^2}{A}} \quad (7)$$

It will be seen that the proportional, first derivative and second derivative terms of $\theta_i$ in the numerator now correspond except for scaling with similar terms in the denominator. It may now be realized that if proper scaling is provided, that each term of the denominator of the right-hand side of Expression 7 may be matched by a term of equal value in the numerator of that fraction, so that the value of the fraction may be made equal to unity.

Figure 3:
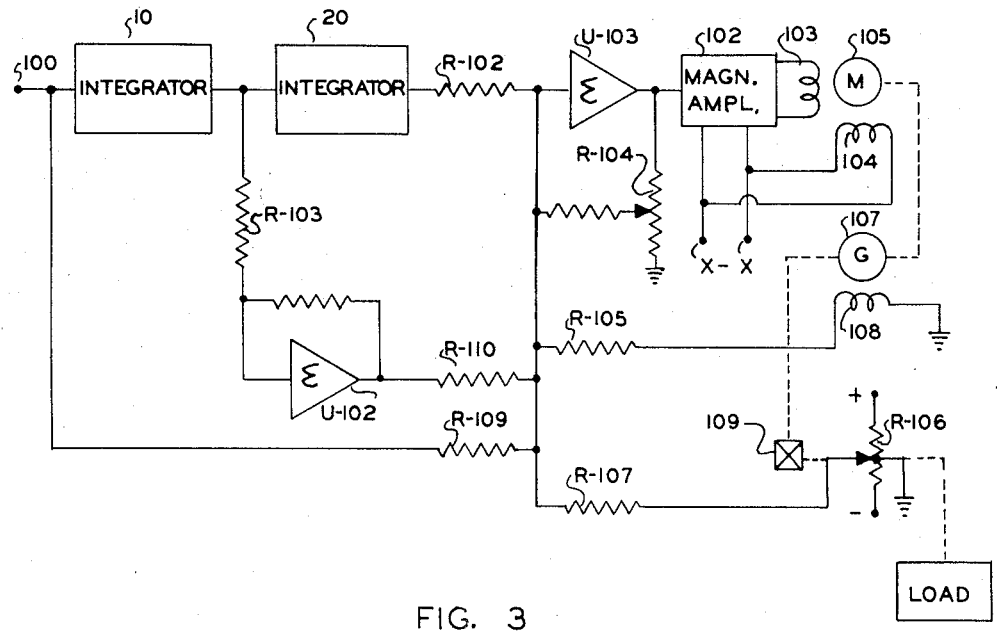
Fig. 3 is an electrical schematic diagram illustrating one manner in which the invention may be applied to an electrical position servomechanism.

Shown in Fig. 3 in electrical schematic form with well known portions shown in block form for clarity is an illustrative electrical servo embodiment of the invention. An electrical potential commensurate in magnitude and polarity with an actual or simulated acceleration is applied to integrator 10, and is integrated with respect to time. The output potential from integrator 10, which potential is commensurate with a velocity, is applied to integrator 20, and also is applied via summing resistor R–103 to buffer amplifier U–102. The output potential commensurate with a position appearing at the output circuit of integrator 20 is applied via summing resistor R–102 to the input of a comparer means shown as comprising a conventional analog computer summing amplifier U–103. The purpose of the servo-mechanism shown in Fig. 3 is to provide an output shaft position commensurate with the computed input potential applied from integrator 20.

Amplifier U–103 is shown as comprising a conventional analogue computer feedback amplifier having a variable feedback impedance R–104 adjustable to provide the desired loop gain, A, of the servo. The output from amplifier U–103 is applied to drive the control coils (not shown) of a conventional magnetic amplifier 102 shown in block form. The reactance coils (not shown) of amplifier 102 are excited by an alternating voltage from a source indicated as X—X, so as to provide an amplified alternating error signal in control winding 103 of a conventional two-phase servomotor. Quadrature winding 104 of the motor is excited by the alternating voltage of source X—X, thereby causing servomotor rotor 105 to have an applied voltage substantially proportional to the magnitude of the amplified alternating voltage applied to control winding 103.

The rotor shaft of the servomotor rotates the rotor 107 of a conventional direct current tachometer generator, inducing a potential in generator coil 108 substantially proportional in magnitude and direction to the angular velocity $\dot{\theta}_o$ of the servomotor shaft. This rate feedback potential is applied via summing resistor R–105 to the input terminal of amplifier U–103. The servomotor shaft is also connected through reduction gearing shown in block form at 109 to drive the servo load and to position the wiper arm of a conventional servo "follow-up" or position feedback potentiometer R–106. The winding of potentiometer R–106 is excited at its opposite ends by opposite-polarity voltages of constant magnitude from a conventional direct current power supply, and its center-tap may be grounded. The position voltage $\theta_o$ derived on the arm of potentiometer R–106 is applied via scaling resistor R–107 to the input circuit of amplifier U–103.

In addition to the above-described conventional input quantities applied to the servo, a $\ddot{\theta}_i$ potential from terminal 100 is applied via scaling resistor R–109, and a $\dot{\theta}_i$ potential derived from the output circuit of integrator 10 is applied through amplifier U–102 and scaling resistor R–110. It will be seen that the accuracy of these two additional potentials is dependent solely upon the characteristics of the integrators, resistors and feedback amplifiers used. The first derivative quantity applied via resistor R–110 is of the same instantaneous polarity as the first derivative quantity ordinarily derived in the prior art by means such as the tachometer generator shown in Fig. 3. Since electronic integrators and summing amplifiers may be construed so as to be virtually free of error, the first derivative term applied via resistor R–110 is more effective in stabilizing and reducing overshoot. Winding 108 of the tachometer generator has inherent inductance which limits the upper frequencies of the first derivative signal derived in that prior art manner, thereby providing insufficient damping at high rates of change of servo angular acceleration. Furthermore, it may be seen from the ideal transfer function of Expression 6, that the derivative signals in the numerator are functions of $\theta_i$ and not $\theta_o$, so that servo-derived derivative signals may be in error in amounts depending upon the servo lag. In practicing the invention, one may provide a first derivative signal solely from the output circuit of integrator 10, or alternatively, one may synthesize the $\dot{\theta}_i$ term by utilizing potentials derived in part from integrator 10 and in part from a servo-driven rate-deriving means such as the tachometer generator. By selection of scaling resistor R–110, or in the latter case, by selection of scaling resistors R–105 and R–110, one may match the $k_{12}$ constant of Expression 6 with the $1/A$ quantity in the denominator of the expression.

In the cases of servos which drive loads having considerable inertia, it is sometimes desirable to match the $$\frac{T}{A}p^2$$

term in the denominator of Expression 6 by the $k_{13}p^2$ term shown in the expression by use of the potential applied via resistor R–109. In a wide variety of servo applications, the facility with which small servo motor time constants may be provided makes it easy to reduce the coefficient $T/A$ of the second derivative term in the denominator of Expression 6 to a very low value, so that provision of a matching $p^2$ term in the numerator is unnecessary to achieve acceptable servo dynamic response. In such case the input potential applied via resistor R–109 may be omitted.

Figure 4:
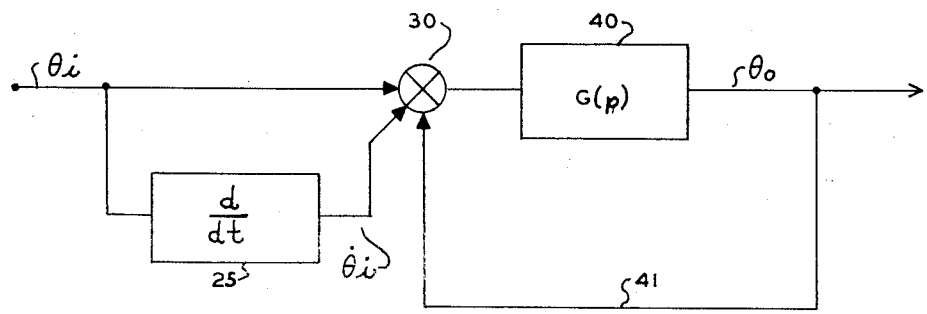
Fig. 4 is a block diagram illustrating a modified form of the invention.

In applying the invention to position servomechanisms which are responsive to other signals than those from the output of a first or second integrator, differentiating means may be utilized to operate upon the position signal to provide first and second derivative signals. Fig. 4 illustrates such an arrangement in block form. Input quantity $\theta_i$ is applied directly to the servo input circuit and also is applied to a differentiating means shown in block form at 25 to provide a further input quantity commensurate with $\theta_i$. The internal details of the servomechanism may be conventional, and may take the form of the servo of Fig. 3, for example. Feedback connection 41 represents the position feedback applied to the comparer means 30 from the servo output circuit. The scaling of the $\theta_i$ quantity applied to the servo from the differentiator may be made to match the servo loop gain as shown above with relation to Fig. 3. For further refinement, the output quantity $\theta_i$ from differentiator 25 may be further differentiated by a second differentiator (not shown) to provide a $p^2$ term for application to the servo comparer device. The arrangement of Fig. 4 is not recommended for use with electrical $\theta_i$ position signals which have been derived by means of potentiometers having limited resolution, since differentiating such signals as the potentiometer arm passes from wire to wire is likely to cause unusable voltage spikes from the differentiators, often detracting from rather than improving servo response.

In its broader aspects, the invention may be seen to comprise the provision of means having a transfer function which is the inverse of the servo overall transfer function for operating upon the servo input quantity. If the servo transfer function is multiplied by an inverse transfer function, a unity transfer function will describe the combined effect of both means, and as mentioned above, a unity overall transfer function characterizes a servo with perfect frequency response. Inasmuch as the inverse transfer function means operates outside the servo loop, the servo loop stability is not affected as in prior art systems where operations are performed on the servo error signal. After tachometer-derived or other rate feedback signals are applied, and after lead and lag networks and other means are utilized to their fullest extent in accordance with the teachings of the prior art, the invention may be utilized to improve still further the servo frequency response. By use of the invention servo frequency response may be made substantially perfectly flat over a wide band of frequencies. It should not be inferred, however, that use of the inverse transfer function means alone will insure unlimited perfectly flat frequency response. It must also be insured, of course, that the servo motor being utilized has sufficient power to provide the desired frequency response, and that other servo motor characteristics and servo amplifier characteristics are such that these components are capable of handling the applied quantities over the frequency ranges desired.

Figure 5:
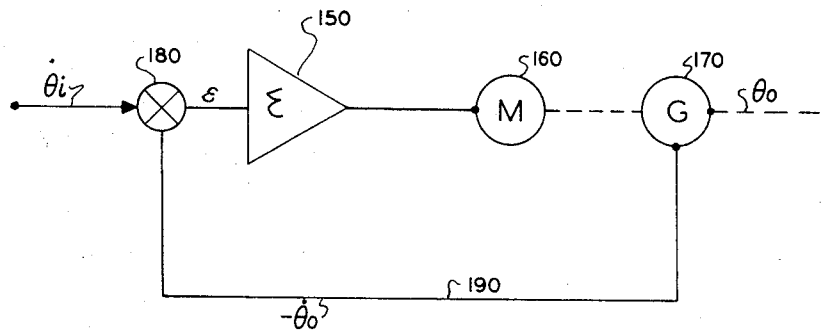
Fig. 5 is a block diagram illustrating a conventional prior art integrating velocity servo system.

It now may be apparent to those skilled in the art that a similar technique may be utilized in connection with an integrating or "velocity" servo system. Referring now to Fig. 5, which represents a prior art velocity servo in block diagrammatic form, an input signal $\theta_i$ is applied via comparer means 180 to the servoamplifier 150, thereby exciting servo motor 160 and driving tachometer generator 170.

Now it will be apparent that the magnitude of the output voltage of tachometer generator 170 will be approximately proportional to its speed of rotation, $\dot{\theta}_o$, so that $$\dot{\theta}_o = A\theta_i$$

and $$\theta_o = A\int\theta_i dt$$

or denoting $d/dt$ by $p$ and $\int(\#)dt$ by $1/p$, $$\theta_o = A\left(\frac{\theta_i}{p}\right)$$

whence $$\frac{\theta_o}{\theta_i} = \frac{A}{p}$$

which becomes $1/p$ for the case where A is equal to unity. This would indeed be the overall transfer function of a perfect velocity servo. In the practical physical system as illustrated in Fig. 5, there are unavoidable physical quantities which can be characterized as proportional to the first derivative and the second derivative of the output which give rise to the undesirable overall transfer function, $$\frac{\theta_o}{\theta_i} = \frac{A}{p(T+p)} \qquad (8)$$

which may be seen to differ from the ideal by the presence of the term $(T+p)$ in its denominator.

Therefore, according to the teachings of the present invention it is expedient to synthesize a $(T+p)$ term in the numerator to effect cancellation of this unwanted term.

Figure 6:
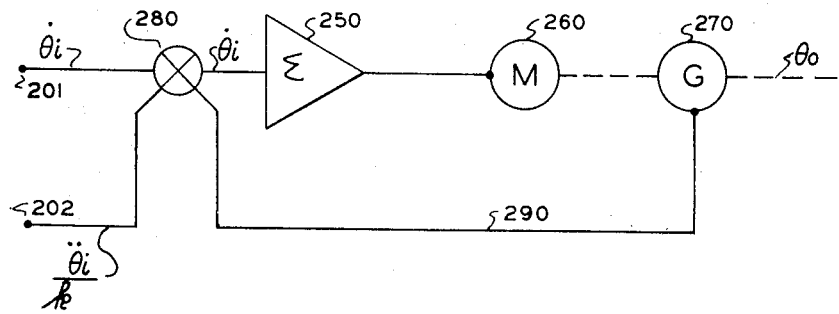
Fig. 6 is a block diagram illustrating an application of the present invention to the conventional prior art integrating velocity servo system of Fig. 5.

Shown in Fig. 6 is a diagram illustrating the application of the principle of the invention to a simple velocity servo system. It will be observed that while the basic velocity servo system connections between the comparer, amplifying and motive means remain conventional, an additional input quantity is applied from terminal 202. This input quantity comprises a signal commensurate with the first time derivative of the input quantity $\theta_i$, namely $p\theta_i/A$, or $\dot{\theta}_i/A$.

Thus the composite input quantity $\theta_i'$ applied to comparer means 280, consists of a voltage commensurate with $\theta_i$, the prime input quantity, applied to terminal 201, and a signal commensurate with $p\theta_i/A$ applied to terminal 202.

As a result the composite input quantity $\theta_i'$ applied to comparer 280 in Fig. 6 may be seen to be equal to $$k_{11}\theta_i + k_{12}p\theta_i$$

wherein $k_{11}$ and $k_{12}$, are constants of proportionality as before. Otherwise written, $$\theta_i' = \theta_i(k_{11} + k_{12}p)$$

In accordance with the present invention, if $\theta_i'$ is substituted in Equation 8 above, the following transfer function may be obtained for the overall transfer function of the improved velocity servo $$\frac{\theta_o}{\theta_i} = \frac{A(k_{11}+k_{12}p)}{p(T+p)}$$

It is well apparent that by scaling, that $A(k_{11}+k_{12}p)$ may be made to equal $(T+p)$, so that the overall transfer function appears as $1/p$, as in the case of a perfect velocity servo.

In applying the invention to apparatus which contains integrating devices, such as Miller integrators, and in which the velocity servo is intended to provide an output shaft position commensurate with the output of a particular integrator, the derivative term added to the velocity servo input quantity may be taken from the input quantity of the particular integrator, with suitable scaling. Where the velocity servo input quantity does not comprise the output quantity of a previous integrator, the derivative term may be synthesized by a differentiating or rate-taking device arranged to operate upon the velocity servo input quantity, by means analogous to the apparatus of Fig. 4.

The invention has been explained with the use of block diagrams partly to emphasize that the invention is applicable to an extremely wide variety of servomechanisms, including electrical, mechanical, hydraulic, pneumatic, and optical types, for example, and hybrids of these types. As a result of this disclosure, those skilled in the art should have no trouble in constructing the invention in a variety of equivalent forms. Due to the breath of the invention, the term "quantity" is used herein to denote any one of the many physical magnitures utilized in the servomechanism arts. Typical equivalent apparatus which may be substituted for the various elements shown herein is shown in "Analysis and Design of Translator Chains" by Herbert Ziebolz, published July, 1951 by Askania Regulator Company, Chicago, Illinois.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Servomechanism apparatus for providing a mechanical output position proportional to an applied input quantity, comprising in combination: comparer means responsive to said input quantity and a feedback quantity for producing an error quantity; means for amplifying said error quantity; motive means responsive to the amplified error quantity; feedback means operated by said motive means to derive a feedback quantity proportional to said mechanical output position; and means for combining a time derivative function of said input quantity with said input quantity in accordance with the overall transfer function of said servomechanism, so as to modify said input quantity in accordance with a transfer function which is the inverse of the servomechanism overall transfer function.

2. Servomechanism apparatus for providing a mechanical output position proportional to an applied input quantity, comprising in combination: comparer means responsive to said input quantity and a feedback quantity for producing an error quantity; means for amplifying said error quantity; motive means responsive to the amplified error quantity; feedback means operated by said motive means to derive a feedback quantity proportional to said mechanical output position; and means for combining first and second time derivative functions of said input quantity to said input quantity in accordance with the overall transfer function of said servomechanism, so as to modify said input quantity in accordance with a transfer function which is the inverse of the servomechanism overall transfer function.

3. Servomechanism apparatus for providing a mechanical output position proportional to the time integral of an applied input quantity, comprising in combination: comparer means responsive to said input quantity and a feedback quantity for producing an error quantity; means for amplifying said error quantity; motive means responsive to the amplified error quantity; feedback means operated by said motive means to derive a feedback quantity proportional to the time rate of change of said mechanical output position; and means for combining a time derivative of said input quantity with said input quantity in accordance with the overall transfer function of said servomechanism, so as to modify said input quantity in accordance with a transfer function which is the inverse of the servomechanism overall transfer function.

4. Apparatus according to claim 2 in which said input quantity comprises the output quantity from a first integrating device, in which said first integrating device is responsive to the output quantity from a second integrating device, and in which said means for modifying said input quantity comprises means for combining quantities applied to said integrating devices with said input quantity.

5. Apparatus for providing a mechanical output quantity commensurate with an input potential comprising a position servomechanism responsive to said input potential, said position servomechanism having an overall transfer function, and means having a transfer function which is the inverse of said servomechanism overall transfer function for modifying said input potential.

6. Servo apparatus for providing a mechanical output position commensurate with an input potential, comprising in combination, potential summing means responsive to said input potential and a plurality of further potentials for providing an error potential, means for amplifying said error potential, a servomotor responsive to the amplified error potential and operable to position a load, a potentiometer operated by said servomotor to provide one of said further potentials, a tachometer generator operated by said motor for providing another of said further potentials, means for deriving a further potential commensurate with the first time-derivative of said input potential, and means for applying said further potential to said potential summing means in accordance with the difference between said further potential from said tachometer generator and the velocity-proportional opposing forces of said motor and load.

7. Apparatus in accordance with claim 6 having means for deriving a further potential commensurate with acceleration-proportional opposing forces of said motor and load, and means for applying said further potential to said potential summing means.

References Cited in the file of this patent

UNITED STATES PATENTS

| | | |
|---|---|---|
| 2,446,163 | Wannamaker | July 27, 1948 |
| 2,788,441 | Zimmerli | Apr. 9, 1957 |
| 2,873,418 | Owen | Feb. 10, 1959 |

OTHER REFERENCES

James, H. M., Nichols, N. B., Phillips, R. S.: "Theory of Servomechanisms," McGraw-Hill, New York, 1947, pp. 62–64, 76 and 77.

Ahrendt, William R.: "Servomechanism Practice," McGraw-Hill, 1954, p. 115.